United States Patent Office 3,323,749
Patented June 6, 1967

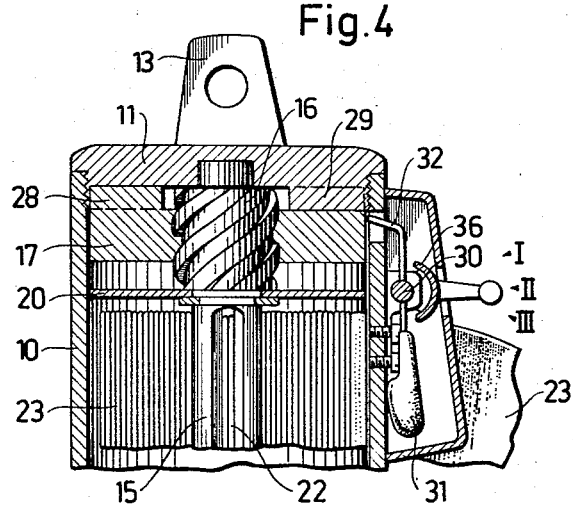
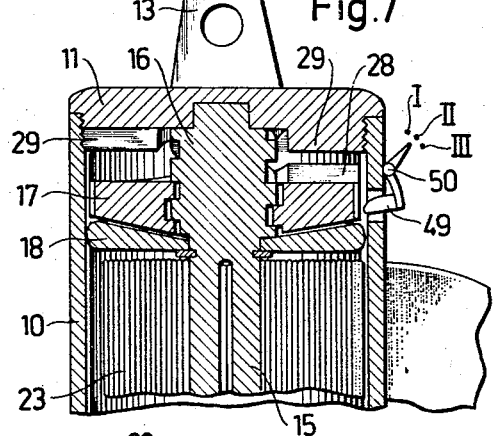
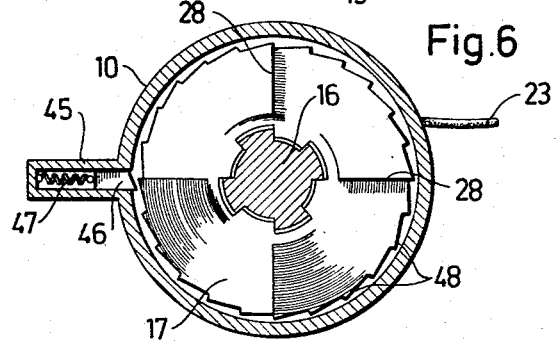

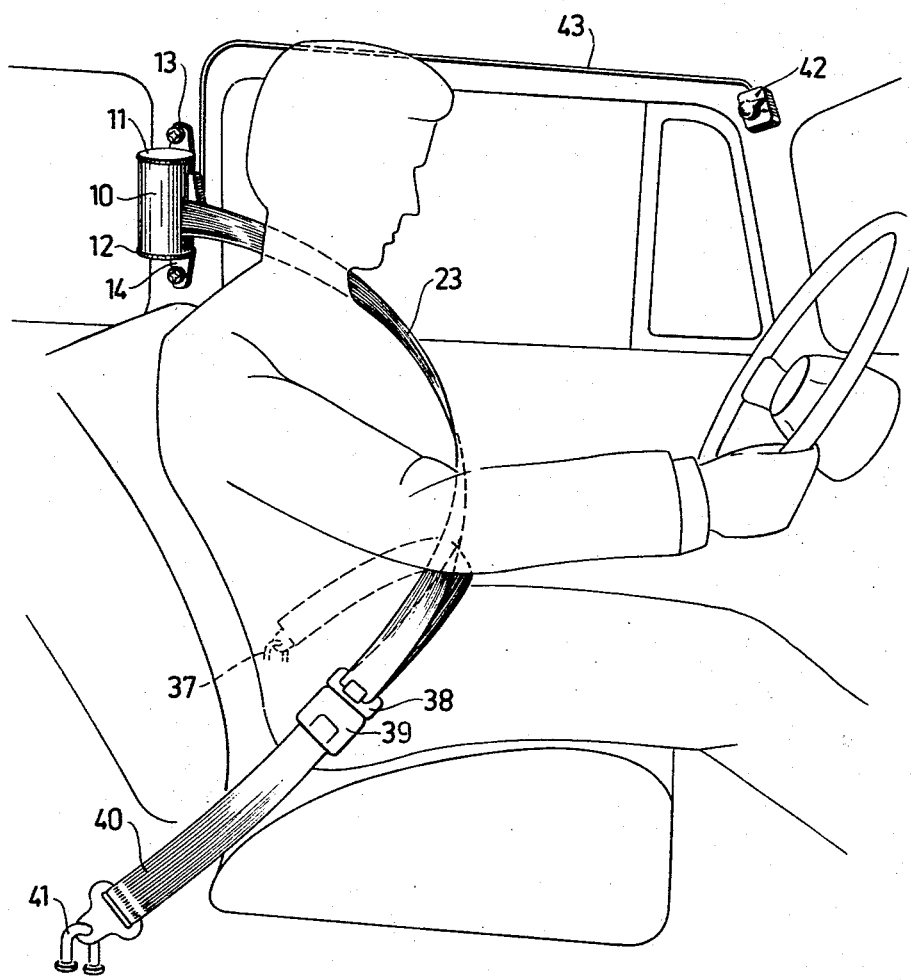

3,323,749
DEVICE FOR AUTOMATICALLY LOCKING A BELT OR THE LIKE
Hans Ingemar Reimertz Karlsson, Engelbrektsvagen 17B, Jakobsberg, Sweden
Filed Sept. 9, 1964, Ser. No. 395,337
Claims priority, application Sweden, Sept. 13, 1963, 10,029/63
16 Claims. (Cl. 242—107.4)

The present invention relates to a device for automatically locking a belt or the like, which through the action of a spring is kept wound upon a spindle, when attempts are made to withdraw the belt from the spindle. In particular, the device according to the invention is intended for use in connection with safety belt equipments for fast-going vehicles, such as automobiles and aircraft, which equipments serve to prevent occupants of the vehicle from being thrown away from their seat in the event of a crash or a sudden deceleration. As long as the belt can be freely withdrawn from the spindle the person using the belt is permitted to carry out normal slow movements in the vehicle with the belt permanently stretched over the body by the action of the spring load. However, as soon as the spindle and hence the belt is locked the belt will secure the occupant in his seat.

Devices of the above kind are previously known in which the spindle upon which the belt or the like is wound, is automatically locked by direct action of a member which reacts due to its inertia upon a certain deceleration of the vehicle. Since the known devices are rather complicated and sensitive to mechanical injury and overload, they are, however, not well suited for use in connection with safety belts.

The present invention has for its object to eliminate the different drawbacks found in previously known devices for automatically locking a belt or the like. The device according to the invention is primarily characterized in that said means for locking the spindle and the belt consists of a nut with coarse pitch which is screwed upon the spindle and which upon rotation of the spindle with respect to the nut in a direction corresponding to the unwinding of the belt from the spindle is axially displaced into a locking position in which the spindle is locked against further rotation. The nut which locks the spindle is preferably provided with locking teeth which upon an axial displacement of the nut towards the locking position are brought into engagement with fixed locking teeth. At slow unwinding operations the nut will be rotated together with the spindle and remain in its inactive position, while if attempts are made to uncoil the belt rapidly the nut will, due to its inertia slip with respect to the spindle so that the spindle is screwed out from the nut which now moves into its locking position and locks the spindle against further rotation. In a preferred embodiment the device is also provided with auxiliary locking means which are brought into engagement with the nut so as to prevent turning thereof when the actual circumstances call for locking of the spindle. The auxiliary locking means can be such that they are moved into their locking position when the deceleration of the vehicle exceeds a predetermined value and they can comprise, for instance, a pendulum which upon deceleration is swung in the direction of movement of the vehicle. Further, it is also possible to use the inertia of the nut to secure positive locking of the nut against rotation upon a certain deceleration of the vehicle.

The invention will now be described in greater detail with reference to the accompanying drawings, on which:

FIGURE 2 shows an end view, taken from above, of the locking nut, while

FIGURE 4 is a sectional view similar to FIGURE 1 showing the spindle and the nut in locked position;

FIGURE 5 is a perspective view illustrating the device according to the invention when mounted together with a so-called three-point safety belt in a car;

FIGURE 6 shows an end view, taken from above, of the locking nut with co-operating auxiliary locking means in a modified embodiment of the invention;

FIGURE 7 shows an axial section through the upper part of a device according to the invention in which the inertia of the nut itself is used for locking the nut against rotation.

Figure 1:
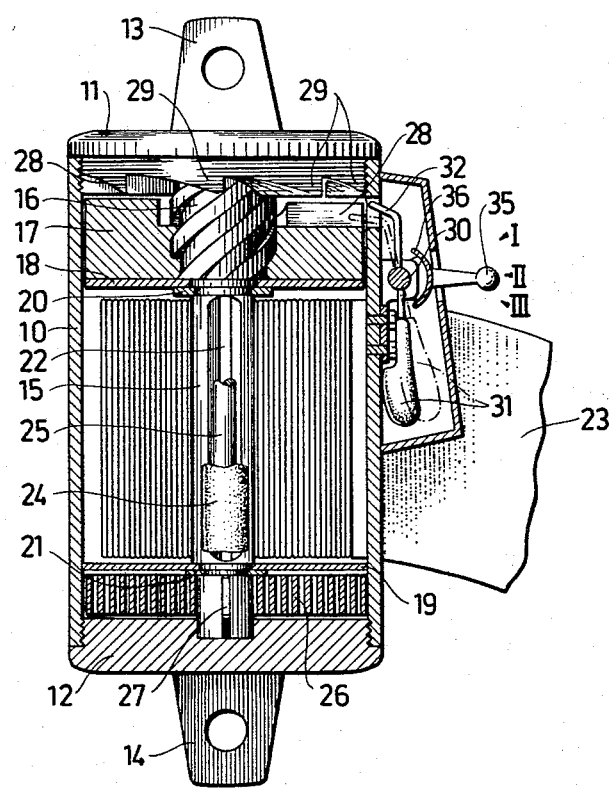
FIGURE 1 shows an axial section through a device according to the invention, provided with auxiliary locking means in the shape of a pendulum and with the nut shown in its inactive normal position.

On the drawings reference numeral 10 designates a cylindrical housing into the open ends of which two rigid caps 11 and 12 are screwed. The two caps 11 and 12 are provided with axially extending mounting ears 13 and 14 so that the housing can be mounted on the body of the vehicle. In caps 11 and 12 is rotatably journalled a spindle 15 provided with plane end faces leaving only a small clearance between them and the corresponding plane bottom surfaces in the respective bearing holes. Adjacent its upper end the spindle 15 is provided with an acme thread 16 having a large pitch, for instance about 45°. Upon said thread is screwed a nut 17 in the shape of a circular disc which fits the inner wall of the cylindrical housing with small clearance. Over the spindle are slipped two circular discs 18 and 19 which are retained in position resting against shoulders on the spindle each by one spring washer 20 and 21, respectively, inserted in an annular slot in the spindle.

Between the two plates 18 and 19 a slot 22 is provided which extends diametrically through the spindle and in which the one end of a belt 23 of nylon or similar material is secured. The belt enters the housing through a slot in the wall of the housing and is at its inner end foiled to form a loop 24 which is passed through the spindle slot 22 and anchored within said slot by means of a pin 25 inserted in the loop and resting together with the loop against the walls of a correspondingly tapered opening of the slot. Between the bottom cap 12 and the lower plate 19 there is provided a tensioned helical spring 26 the outer end of which is connected to the housing 10 and the inner end of which extends with a bent end portion into a traverse end slot 27 in the spindle 15. The spring 26 tends to rotate the spindle 15 in such a direction as to wind up the belt 23 on the spindle, as shown on the drawings.

The nut 17 which normally rests against the upper plate 18 owing to its own weight is on its upper end face provided with four solid locking teeth 28 evenly distributed in circumferential direction, while the upper cap 11 is provided on its lower side with eight such locking teeth 29. When the nut 17 is in its inactive position shown in FIGURE 1, an axial clearance of about 0.5 mm. will be present between the tops of the different sets of locking teeth, thus permitting the nut 17 to rotate freely within the housing. On the side of the housing 10 facing into the direction of travel of the vehicle there is provided a pendulum 31 swingably mounted on a transverse horizontal axle 30 and having an elongated portion 32 which extends upwards and backwards, said elongated portion projecting into the path of movement of the locking teeth 28 on the nut 17 when the pendulum, upon deceleration of the vehicle or due to travelling a descendant path is swung into the position illustrated by dotted lines in FIGURE 1.

The mode of operation of the device is as follows:

At a relatively slow withdrawal of the belt 23, while the pendulum 31 is in its normal position shown by full lines, the nut 17 will rotate together with the spindle while resting against the plate 18 with its locking teeth 28 out of engagement with the locking teeth 29 on the lower end face of the upper cap 11. Under these circumstances the belt can be freely unwound and wound up on the spindle 15 which means that the occupant using the safety belt is permitted to move at will within the vehicle with the belt permanently stretched against his body by the action of the spring 26. If, on the other hand, the pendulum 31 has swung into its position of engagement illustrated by dotted lines, for instance upon retardation of the vehicle or while travelling a descendant path, the elongation 32 of the pendulum will come into engagement with the locking teeth 28 on the nut 17 and prevent the nut from carrying out any rotational movement so that the spindle, upon application of pulling forces in the belt, will rotate with respect to the nut and thus be screwed out of the nut, whereby the nut will be axially displaced in an upward direction. During the initial movement of the nut the elongated portion 32 of the pendulum is forced out of the path of the locking teeth 28 which are instead brought into engagement with the locking teeth 29 on the cap 11. The relative rotation of the spindle with respect to the nut will continue until the nut 17 has been brought to rest against the lower face of the cap 11, compare FIGURE 4, in which position the spindle and the belt 23 are suddenly locked so that the occupant using the belt is rigidly secured in his seat. As soon as the pulling forces in the belt 23 have vanished the belt is again wound up upon the spindle by the action of the spring 26, and the engagement between the locking teeth 28 and 29 will then cease permitting the nut to be screwed down on the spindle and resume its normal position resting against the disc 18, whereby the occupant will again be permitted to move freely within the vehicle.

In the event of a very strong application of the brakes or a crash the retardation of the vehicle and hence the rate at which the belt 23 is unwound from the spindle 15 will be so high that the inertness of the nut 17 is sufficient to secure the required rotation of the spindle within the nut for forcing the locking teeth 28 of the nut into engagement with the locking teeth 29 on the cap 11. In such circumstances the belt is thus automatically locked irrespective of the action of the pendulum 31. Therefore, if a device which locks the belt 23 only upon sudden deceleration or in the event of a crash is found satisfatcory, the pendulum may be omitted.

Figure 2:
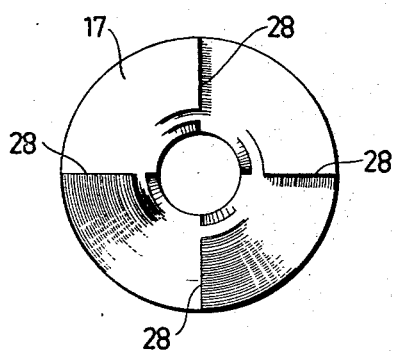
Figure 3:
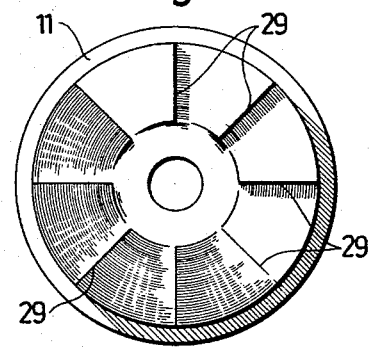
FIGURE 3 shows an end view, taken from below, of the upper bearing for the spindle.

The locking device illustrated in FIGURES 1 and 2 can suitably be supplemented by an arrangement permitting manual displacement of the pendulum from its normal position into a permanently active position or into a permanently inactive position, respectively. The pendulum 31 can easily be given a shape such that it is automatically displaced into the locking position already upon a slight deceleration of the vehicle which is fully satisfactory under normal circumstances. However, in some cases one might prefer to lock the belt 23 permanently, for instance if there is any risk that the occupant will fall asleep and while sleeping successively move forward and thus get his head in dangerous closeness to the front shield. Such an arrangement can comprise an arm 35 journalled on the pendulum axle 30 to rotate independently of the pendulum and carrying an arcuate member 36 which has its two ends within the path of movement of the pendulum. If the arm 35 is manually moved into the position I the arcuate member 36 will hold the pendulum 30 in permanent engagement with the locking teeth of the nut 17 while in position II the pendulum functions normally and is freely swingable. In position III the arcuate member 36 holds the pendulum in a position out of the path of said locking teeth which means that the locking device fill function only upon very sudden deceleration or in a crash.

The arm 35 can preferably be operated over a Bowden-cable or similar means by the aid of a control lever within easy reach for the occupant. Such an arrangement is schematically shown in FIGURE 5 which illustrates the application of the invention for locking a so-called three-point safety belt. From the locking device according to the invention, which is attached to the rear door pillar approximately on level with the occupant's shoulder, the belt 23 passes in a loop over the chest of the occupant to an anchorage point 37 in the floor board just behind the seat. Over the belt loop 23 is slipped the slotted portion of the one member 38 of a buckle the other member 39 of which is connected to a belt 40 which at its other end is secured to the floor board at a point 41 just behind and on the other side of the occupant's seat. In order to facilitate a manual displacement of the pendulum 31 a control lever 42 is provided well in reach of the occupant, said control lever being operatively connected to the arm 35 over a Bowden-cable 43.

Naturally in lieu of the pendulum any other inertia-operated means may be used for securing the locking nut against rotation at deceleration of the vehicle. In FIGURE 6 this means comprise a radial guide 45 extending in the longitudinal direction of the vehicle, and a locking member 46 which is movable within said guide by a stretched tension spring 47 normally held in its inactive position in which it is out of engagement with the locking teeth 48 provided on the periphery of the locking nut 17. Upon a sufficient retardation of the vehicle, for instance due to brake application, the locking member 46 moves, while overcoming the tension in spring 47, into engagement with one of the locking teeth 48 on the locking nut 17 whereby the nut is prevented from rotating together with the spindle 15 when the latter is rotated upon the application of pulling forces in the belt 23.

FIGURE 7 illustrates an alternative embodiment in which the inertia of the locking nut itself is used for positively locking the nut against rotation upon retardation of the vehicle. In this embodiment the thread on the locking nut 17 is such that a considerable radial clearance is obtained between the locking nut and the screw spindle. The locking nut 17 which has a tapered lower side rests against a correspondingly tapered seat on the upper face of the relatively thick upper plate 18 and is centered with respect to said plate and said screw spindle, respectively, by its own weight. Between the periphery of the nut 17 and the inner side of the housing 10 there is a clearance which is somewhat smaller than the radial clearance between the screw spindle and the nut. Along its periphery the nut 17 is provided with locking teeth, not shown. A locking lever 49 which is mounted on an axle 50 and manually swingable between three different positions I, II, III projects in its normal or automatic operation position II a short distance behind the inner cylinder surface of the housing 10, yet not so far that it will enter the path of movement of the locking teeth of the nut when the latter is in its centered normal position. Upon deceleration of the vehicle the locking nut 17 is displaced into radial contact with the wall of the housing 10 due to its inertia. Hereby the locking teeth on the periphery of the nut are brought into engagement with the locking lever 49. The lever prevents rotation of the nut when the spindle 15 is rotated as a result of the withdrawal of the belt from the spindle, so that the spindle will force the nut axially into its upper locking position in which the nut and spindle are positively locked. In position I the locking lever 49 is in permanent engagement with the locking nut while in position III said lever is retracted and inoperative.

Of course the invention is not restricted to the embodiments herein described. Thus, many different modifications are possible within the scope of the invention. Thus, the screw thread does not necessarily have to be formed on an elongated part of the spindle on which the belt is wound up. It is for instance also possible to use a separate screw spindle which is coupled to the belt spindle, for example by means of an angle gear. Nor is it necessary to mount the screw spindle in a vertical position so that the nut tends to move into its normal position solely by the action of gravity. Beyond safety belt equipments the device according to the invention can also have other applications where a positive and rapid locking of a belt wound up on a spindle or similar means is required.

What is claimed is:

1. A reel for an elongated, flexible element, comprising: a housing; spindle means rotatably mounted in said housing, including a spool portion and a threaded portion adapted to rotate together in either direction, said threaded portion having a plurality of high pitch, helical threads extending from said spool portion to a point adjacent the near end of said housing; an elongated flexible element operatively attached to said spool portion of said spindle; spring means urging said spindle to rotate in a direction in which said flexible elongated element is wound on said spool portion; stop means in the interior of said housing adjacent said threaded portion of said spindle; and a lock nut threadably mounted about said threaded portion of said spindle with said threaded portion of said spindle passing completely through said nut means, and having its threads in operative engagement with the threads of said spindle and adapted to normally assume a position out of contact with said stop means and rotate with said spindle and to be abnormally at least decelerated relative to said spindle upon the application of a sudden pulling force to said elongated flexible element and thereby permit said spindle to rotate in an unwinding direction relative to said nut and move said nut in a direction parallel to the axis of said spindle until said nut is positively locked against said stop means.

2. A reel in accordance with claim 1 wherein locking teeth are formed on the nut and said locking teeth engage the stop means when said nut is displaced in an axial direction by the spindle rotating relative to said nut.

3. A reel in accordance with claim 1 which additionally includes mounting means for mounting said reel in a vertical position and wherein the pitch of the threaded portion of the spindle is such that the nut will be rotated to its normal position out of contact with the stop means by the weight of said nut.

4. A reel in accordance with claim 1 wherein the mass of the nut is such that the inertia of said nut decelerates said nut relative to said spindle.

5. A reel in accordance with claim 1 wherein the reel additionally includes a weight of sufficient mass that it will be moved into contact with the nut and at least momentarily stop the rotation of said nut relative to said spindle upon said deceleration of said housing.

6. A reel in accordance with claim 5 wherein the weight is a pivoted pendulum.

7. A reel in accordance with claim 5 wherein the weight is normally biased out of engagement with the nut by a spring means.

8. A reel in accordance with claim 1 which additionally includes manual lock means adapted to engage and stop the rotation of said nut relative to said spindle.

9. A reel for an elongated, flexible element, comprising: a housing, spindle means rotatably mounted in said housing, including a spool portion and a threaded portion adapted to rotate together in either direction; an elongated, flexible element operatively attached to said spool portion of said spindle; spring means urging said spindle to rotate in a direction in which said elongated flexible element is wound on said spool portion; stop means in the interior of said housing adjacent said threaded portion of said spindle; a lock nut threadably mounted on said threaded portion of said spindle and adapted to normally assume a position out of contact with said stop means and rotate with said spindle; and holding means on said housing; said nut having threads of differing radial dimension than said threaded portion of said spindle, whereby said nut fits loosely on said spindle so as to be free to move radially relative to said spindle and engage said holding means when said lock nut, due to its inertia, is moved radially relative to said threaded spindle on a sudden change of speed of said housing, and thereby permit said spindle to rotate relative to said nut and move said nut in a direction parallel to the axis of said spindle until said nut is positively locked against said stop means.

10. A reel in accordance with claim 9 wherein the holding means includes a second stop adapted to engage and at least momentarily stop the rotation of the nut relative to the spindle upon movement of said nut radially with respect to said spindle and the first mentioned stop is adapted to engage and positively lock against said nut upon said rotation of said spindle relative to said nut and the axial movement of said nut.

11. A reel in accordance with claim 10 wherein the second stop means includes a manual lock adapted to manually move said second stop means into and out of a fixed position in engagement with the nut when said nut is in its normal position.

12. A reel in accordance with claim 9 which additionally includes mounting means for mounting said reel in a vertical position and wherein the weight of the nut is such that said nut will be rotated to its normal position out of contact with the stop means by the weight of said nut.

13. A reel in accordance with claim 12 wherein the nut rests upon a seat downwardly and inwardly inclined toward the axis of the spindle and the nut has a lower surface complementarily inclined downwardly and inwardly toward said axis of said spindle.

14. A reel in accordance with claim 9 wherein the nut is of sufficient mass to move into engagement with the stop means upon said deceleration of said housing.

15. A reel in accordance with claim 9 wherein the mass of the nut is such that a predetermined rapid unreeling of the flexible element decelerates said nut relative to said spindle and thereby permits said spindle to rotate relative to said nut until said nut is positively locked against said stop means.

16. A reel in accordance with claim 9 which additionally includes manual lock means adapted to engage and stop the rotation of said nut relative to said spindle.

References Cited

UNITED STATES PATENTS

| | | | |
|---|---|---|---|
| 2,659,573 | 11/1953 | Smith | 254—152 |
| 2,732,149 | 1/1956 | Whittingham et al. | 242—107.4 |
| 2,843,335 | 7/1958 | Hoven et al. | 242—107.4 |
| 3,058,687 | 10/1962 | Bentley | 242—107.4 |
| 3,203,641 | 8/1965 | McFarlane et al. | 242—107.4 |

FRANK J. COHEN, *Primary Examiner.*

W. S. BURDEN, *Assistant Examiner.*